United States Patent [19]

Sears

[11] 3,968,301

[45] July 6, 1976

[54] PRESSURE-SENSITIVE RECORD MATERIAL AND DYE SOLVENTS THEREFOR

[75] Inventor: James Kern Sears, Webster Groves, Mo.

[73] Assignee: Monsanto Company, St. Louis, Mo.

[22] Filed: Oct. 29, 1974

[21] Appl. No.: 518,309

Related U.S. Application Data

[63] Continuation of Ser. No. 225,658, Feb. 11, 1972, abandoned.

[52] U.S. Cl. ................................ 428/323; 428/411; 428/478; 427/261

[51] Int. Cl.$^2$ ........................ B32B 5/16; B05D 5/00

[58] Field of Search ........... 428/478, 323, 488, 411; 427/261; 8/94

[56] References Cited

UNITED STATES PATENTS

| | | | |
|---|---|---|---|
| 2,646,367 | 7/1953 | Davis | 428/446 |
| 3,009,760 | 11/1961 | Lenz | 8/94 |
| 3,016,308 | 1/1962 | Macaulay | 117/36.1 |
| 3,625,736 | 12/1971 | Matzukawa et al. | 117/36.2 |
| 3,901,986 | 8/1975 | Brockett et al. | 428/411 |

FOREIGN PATENTS OR APPLICATIONS

| | | | |
|---|---|---|---|
| 915,342 | 1/1963 | United Kingdom | 8/94 |

*Primary Examiner*—Marion E. McCamish
*Assistant Examiner*—Patricia C. Ives
*Attorney, Agent, or Firm*—William H. Duffey

[57] ABSTRACT

Pressure-sensitive record materials wherein a colorless or substantially colorless chromogen is reacted in the presence of a solvent with an acidic sensitizing material to form a colored mark in a pattern determined by the application of localized pressure to the record material are prepared utilizing terphenyls, partially hydrogenated terphenyls, and lower alkylated terphenyls having at least 65 percent aromaticity as the solvent for the chromogenic material. The terphenyl compounds which are liquids are useful alone or in combination with diluents to give rapid color development on both resin and clay coated papers. Compounds which are normally solids or semisolids are useful in combination with diluents where the combination is a liquid.

15 Claims, No Drawings

PRESSURE-SENSITIVE RECORD MATERIAL AND DYE SOLVENTS THEREFOR

This is a continuation of application Ser. No. 225,658, filed Feb. 11, 1972, now abandoned.

BACKGROUND OF THE INVENTION

1. Field of the Invention

This invention relates to pressure-sensitive record materials and particularly to solvents for colorless dyes used in preparing such materials.

2. Description of the Prior Art

Conventional pressure-sensitive record materials comprise in combination marking fluid or dye and a solid coreactant which are deposited in substantially continuous coatings upon a dye carrying sheet and a dye receiving sheet, and which are separated by a physical barrier which is eliminated by the application of pressure. One such record material comprises a first sheet material containing a substantially continuous covering of pressure rupturable capsules containing as a marking fluid a solution of a chromogenic material in a solvent, and a second sheet material containing in apposition to the capsules on the first sheet a continuous coating of a solid acidic sensitizing material which is reactive with the marking liquid to form a colored reaction product. The capsules containing the marking fluid are sufficient in number and volume to yield a continuous image pattern when the marking fluid is expelled from the capsules by pressure applied in an image pattern.

The marking fluid contained in the capsules of the first sheet can be any of a variety of liquid compositions provided they produce a colored mark when allowed to contact the solid coreactant. Generally desirable properties of the marking fluid are that it be easily encapsulated by conventional techniques, that it have good shelf life in the encapsulated form, and that it be stable a moderately elevated temperatures. It is also important that the mark produced as the result of the reaction between the marking fluid and the solid coreactant develop rapidly, be fade resistant and be resistant to bleeding or feathering as a result of capillary action or other surface phenomena.

The marking fluid is preferably a solution of a solvent and a colorless or substantially colorless chromogenic material which develops color upon contact and reaction with the solid coreactant or sensitizing material. Such marking fluids have the advantage of not discoloring hands, clothing, or other surfaces if accidentally ruptured thereon.

Solid coreactants or sensitizing materials for such marking fluids include finely divided acidic compounds which are also colorless or nearly colorless in their natural form. Commonly used materials include organic polymers and inorganic clays which are applied to the paper surface in any suitable paper coating binder material such as starch, casein, polymer, or latex.

The solvent functions to provide a carrier for the chromogen and a medium for the reaction between the chromogen and the acidic sensitizing material. As a general practice, the chromogen is dissolved in the solvent to form a solution which may be encapsulated and applied as a coating to one surface of the record paper. The solvent must be capable of holding the chromogen in solution within the capsule, of carrying the marking liquid to the sensitized paper when the capsule is ruptures, and of promoting or at least not inhibiting color development with the solid coreactant. In addition, since inadvertent rupture of the capsule is possible by careless handling, the solvent must be an innocuous material which is not injurious to skin, clothing or environment.

The solvent is an important factor in determining the performance of the record transfer material in terms of stability of the paper to heat and storage time, rate of color development, extent of color development, and durability of image. The prior art, however, has paid little attention to the subject of solvents and has concentrated instead on improvements in chromogens and sensitizing materials utilizing solvents taken from a limited number of compounds such as petroleum oils and distillates, toluene, perchloroethylene, xylene, chlorinated paraffins, dioctyl phthalate and methyl salicylate. Chlorinated diphenyls, alkylated diphenyls, and hydrogenated terphenyls for example have been suggested in U.S. Pat. No. 2,646,367 as a substitute for petroleum oil in a system wherein the petroleum oil functioned as an inert carrier for a colorless dye. Although some of these past applications have given fair results, only the polychlorinated biphenyls have proved sufficiently effective in providing dark and permanent colors to be of commercial value as a dye solvent, and the full potential of the dye solvent as a positive contributor to the performance of the record transfer material has not heretofore been realized. Certain of the polychlorinated biphenyls have now been determined to be biologically stable and potentially harmful to the environment, and thus undesirable for continued use in this application.

It is accordingly an object of the present invention to provide solvents and combinations of solvents which are superior to those presently used in record transfer materials and which make a positive contribution to the performance of the paper. Another object of this invention is to provide a dye solvent which is free of polychlorinated biphenyls. Further objects of the invention will be apparent from the ensuing description and examples.

SUMMARY

Improved solvents for chromogenic materials used in pressure-sensitive record transfer materials are terphenyls, partially hydrogenated terphenyls, $C_{1-4}$ alkyl substituted terphenyls, and mixtures thereof having at least about 65 percent aromaticity, and mixtures thereof with organic diluents.

These solvent compositions promote deep and fade resistant color development on resin or clay coated paper.

DESCRIPTION OF PREFERRED EMBODIMENTS

The pressure-sensitive recording paper systems utilizing colorless dye solutions comprising chromogens and the improved solvents of the present invention may be prepared according to well known conventional procedures. Descriptions of methods for preparing both the dye carrying paper and the receiving paper of either the resin coated or clay coated type are to be found in the literature and such methods do not constitute a part of the present invention. Indeed, in most instances, the solvents disclosed herein may be simply substituted for conventional dye solvents in order to produce improved recording paper systems according to such conventional procedures.

The solvents of the present invention are preferably utilized in combination with one or more of several conventional chromogenic materials of normally colorless form. One such class of chromogens comprises colorless aromatic double bond organic compounds which are converted to a more highly polarized conjugated and colored form when reacted with an acidic sensitizing material. A particularly preferred class of chromogens include compounds of the phthalide type such as crystal violet lactone which is 3,3-bis(p-dimethylaminophenyl)-6-dimethylaminophthalide and malachite green lactone which is 3,3-bis(p-dimethylaminophenyl)phthalide. Other phthalide derived chromogenic materials include 3,3-bis(p-m-dipropylaminophenyl)phthalide, 3,3-bis(p-methylaminophenyl)phthalide, 3-(phenyl)-3-(indole-3-yl)phthalides such as 3-(p-dimethylaminophenyl)-3-(1,2-dimethylindol-3-yl)phthalide, 3,3-bis(phenylindol-3--yl)phthalides such as 3,3-bis(1,2-dimethylindol-3-yl)phthalide, 3-(phenyl)-3-(heterocyclic-substituted)phthalides such as 3-(p-dimethylaminophenyl)-3-(1-methylpyrr-2-yl)-6-dimethylaminophthalide, indole and carbazole-substituted phthalides such as 3,3-bis(1,2-dimethylindol-3-yl)-5-dimethylaminophthalide and 3,3-bis(9-ethylcarbazol-3-yl)-5-dimethylaminophthalide, and substituted indole phthalides such as 3-(1,3-dimethylindol-3-yl)-3-(2-methylindol-3-yl)phthalide.

Other chromogenic dye compounds also useful in the practice of this invention include indole substituted pyromellitides such as 3,5-bis-(p-diethylaminophenyl)-3,5-bis-(1,2-phenyl)-3,7-bis-(1,2-dimethylindol-3-yl)pyromellitide, 3,3,7,7-tetrakis-(1,3-dimethylindol-3-yl)pyromellitide and 3,3,5,5-tetrakis-(1,2-dimethylindol-3-yl)pyromellitide; and leucauramines and substituted leucauramines such as p-xylyl-leucauramine and phenyl-leucauramine. Also included are orthohydroxybenzoacetophenone, 2,4-bis[p-(p-dimethylaminophenylazo)anilino]-6-hydroxy-sym-triazine, N,3,3-trimethylindolinobenzospiropyrans, and N,3,3-trimethylindolino-$\beta$-naphthospiropiranes.

An auxiliary coloring agent can be employed with the above chromogens to provide fade resistance where fading is a problem. Many phthalide compounds such as crystal violet lactone for example, are characterized by rapid color development with a normal tendency to fade during the course of time. One suitable auxiliary coloring agent is benzoyl leuco methylene blue which oxidizes when released on the paper to slowly form a permanent blue color. The combination of a phthalide chromogen and such a colorless oxidizable auxiliary coloring agent provides a composition having both rapid color development and fade resistance.

The solvents of this invention are terphenyls, partially hydrogenated terphenyls, and $C_{1-4}$ alkyl-substituted terphenyls having at least about 65 percent aromaticity. Fully aromatic tephenyls are waxy solids having pour points of about 55°C. for o-terphenyl to 213°C. for p-terphenyl. Hydrogenation or alkylation of these compounds to decrease aromaticity reduces the pour point, and o-terphenyl hydrogenated to about 70 percent aromaticity, for example, has a pour point of about −21°C. Partially hydrogenated terphenyls, particularly those having from about 65 to 85 percent aromaticity, are accordingly generally preferred over fully aromatic terphenyls.

The solvents of this invention which are liquids at room temperature may be used alone or in combination with diluents. Solvents which are solids or semisolids at room temperature must necessarily be used in combination with another material, hereinafter referred to as a diluent, in order to provide a mixture having the requisite degree of liquidity for use in pressure-sensitive recording paper systems. For purposes of this invention the term "diluent" includes both inert or substantially inert materials which are of little practical use alone as dye solvents either because they have poor solvating power for the chromogen or because they act in some way to inhibit the development of color, as well as some more active materials such as aromatic organic compounds which may be useful by themselves as dye solvents.

Either type of diluent may be used in combination with the solvents of this invention. For example, a solvent may be admixed with from 0 to about 3 parts of a diluent for each part of solvent wherein the diluent is a mineral or vegetable oil, such as kerosene, paraffin oil, mineral spirits, castor oil, neat's-foot oil, sperm oil, lard oil, olive oil, soybean oil, cottonseed oil, coconut oil, or rapeseed oil, or an organic aryl compound such as aromatic naphtha, $C_{1-12}$ alkyl benzene, benzyl biphenyl, or $C_{1-16}$ alklaryl indane. These diluents function to alter physical properties of the terphenyl such as viscosity or vapor pressure as may be desired for handling or processing considerations. The diluents may also serve to reduce the total cost of the solvent in the system and to enhance in some instances the performance of the solvent particularly with respect to speed of color development or resistance to fade.

To solvents may also contain certain additives specifically intended to alter or control the final properties of the fluid as for example viscosity control agents, vapor pressure control agents, freezing point depressants, odor masking agents, antioxidants, colored dyes and the like.

In a preferred embodiment of the present invention, th chromogenic material is dissolved in a selected solvent to form a marking liquid which is reactive with the acidic solid coreactant material. The acidic material can be any compound within the definition of a Lewis acid, i.e. an electron acceptor with reference to the chromogen, which promotes the polarization of the chromogen into a colored form. The solid acidic material further serves as an adsorbent of the marking fluid to receive the transferred image. Commonly used acidic materials include acid clays and acidic organic polymeric materials such as phenolic polymers, phenol-acetylene polymers, maleic acid-rosin resins, partially or wholly hydrolyzed styrene-maleic anhydride copolymers and ethylene-maleic anhydride copolymers, carboxy polymethylene and wholly or partially hydrolyzed vinyl methyl ether, maleic anhydride copolymer and mixtures thereof.

The effect of various solvents on the rate and extent of color development was determined in a laboratory procedure which consisted of preparing a marking fluid comprising solution of a chromogen in the solvent to be tested, applying the fluid to a receiving paper coated with a clay or resin coreactant material, and measuring the extent and rate of color development with a reflectance meter.

In the following examples a standard marking fluid for resin coated papers was prepared by adding 0.5 grams of crystal violet lactone (CVL) to 10 grams of solvent with agitation and warming to 100°–120°C. if necessary to achieve solution. The solution was cooled to room temperature, seeded with a few crystals of the chromogen, and allowed to stand for several days with occasional shaking to assure that the solution was not supersaturated. A standard marking fluid for clay-coated papers was prepared in a like manner by adding 1.15 grams of a mixture of 5 parts crystal violet lactone and 4 parts benzoyl leucomethylene blue to 8.85 grams of a selected solvent.

The color development test consisted of laying a bead of the marking fluid by means of a medicine dropper across a 1.25 inch wide strip of either clay-coated or resin-coated receiving paper. A stopwatch ws started and by means of a razor blade the bead was knife-coated along the paper strip. Five seconds after the coating and at predetermined intervals thereafter the reflectance of the paper was measured with a Photovolt reflection meter. The meter was calbrated to register 100% reflectance on the particular paper being tested when wet with solvent only and backed with a standard white porcelain plate. Final reflectance readings on the dry, marked paper were made after 24 hours with the meter calibrated to register 100% reflectance on dry unstained paper. The extent of color development designated as "percent color" was calculated as 100 minus reflectance; thus, the greater the percent color value, the darker the developed color.

The results of tests evaluating representative solvent compositions are presented in Table I and illustrate the generally superior performance obtained with the solvents of this invention. The specific materials presented in the table are for purposes of illustration only and the instant invention is not to be limited thereto.

TABLE I

PARTIAL HYDROGENATED TERPHENYLS

| Terphenyl % Aromaticity | Paper Type | Time to Reach % of Max. Color, Seconds 30% | 40% | 50% | 60% | % Color Development at X Time 10 sec. | 30 sec. | 60 sec. | 1 hr. | 24 hrs. | 7 days |
|---|---|---|---|---|---|---|---|---|---|---|---|
| 75 | Resin | 84 | 130 | — | — | 17 | 19 | 25 | 54 | 60 | 37 |
| 70 | Resin | 66 | 120 | — | — | 19 | 22 | 28 | 54 | 60 | 35 |
| 65 | Resin | 78 | 150 | — | — | 19 | 21 | 26 | 53 | 58 | 35 |
| 60 | Resin | 66 | 155 | — | — | 20 | 23 | 29 | 48 | 52 | 19 |
| 75 | Clay | — | — | <5 | 45 | 55 | 58 | 60 | 65 | 65 | 61 |
| 70 | Clay | — | — | <5 | 45 | 55 | 58 | 60 | 65 | 64 | — |
| 65 | Clay | — | — | <5 | 35 | 55 | 60 | 62 | 65 | 64 | 62 |
| 60 | Clay | — | — | 10 | 26 | 49 | 55 | 56 | 60 | 62 | 54 |

TABLE II

MIXTURES COMPRISING TERPHENYLS AND PARTIALLY HYDROGENATED TERPHENYLS

| Solvent Composition | Paper Type | Time to Reach % of Max. Color, Seconds 30% | 40% | 50% | 60% | % Color Development at X Time 10 sec. | 30 sec. | 60 sec. | 1 hr. | 24 hr. |
|---|---|---|---|---|---|---|---|---|---|---|
| (a) 50% Terphenyl at 100% Aromaticity 50% Dodecyl Benzene | Resin | 35 | 52 | 120 | — | 15 | 27 | 43 | 58 | 60 |
| (b) 50% Terphenyl at 80% Aromaticity 50% Dodecy Benzene | Resin | — | — | 90 | — | — | — | 43 | — | 68 |
| (c) 50% Terphenyl at 70% Aromaticity 50% Dodecyl Benzene | Resin | — | — | 102 | — | — | — | 39 | — | 69 |
| (d) 50% Terphenyl at 60% Aromaticity 50% Dodecyl Benzene | Resin | — | — | 225 | — | — | — | 45 | — | 47 |
| (e) 50% Terphenyl at 50% Aromaticity 50% Dodecyl Benzene | Resin | — | — | 600 | — | — | — | 43 | — | 23 |
| (f) 50% Terphenyl at 100% Aromaticity 50% 1,3,3-Trimethyl-1-phenyl indane | Resin | >3 min. | — | — | — | 10 | 11 | 13 | 53 | 67 |
| (g) 25% Terphenyl at 100% Aromaticity 25% 1,3,3-Trimethyl-1-phenyl indane 50% Kerosene | Resin | 33 | 48 | 75 | — | 17 | 28 | 47 | 62 | 63 |
| (h) 50% Hydrogenated Terphenyl at 70% Aromaticity 50% Polyethyl Benzene | Resin | 10 | >3 min. | — | — | 30 | 36 | 37 | 41 | 45 |
| (i) 50% Hydrogenated Terphenyl at 80% Aromaticity 50% Polyethyl Benzene | Resin | 8 | 25 | — | — | 34 | 41 | 44 | 47 | 52 |
| (j) 50% Terphenyl at 100% Aromaticity 50% Corn Oil | Clay | <5 | 20 | 30 | — | 37 | 42 | 44 | 51 | 53 |
| (k) 50% Hydrogenated Terphenyl at 70% Aromaticity 50% Olive Oil | Clay | <5 | 20 | 60 | — | 38 | 42 | 44 | 49 | 52 |
| Controls - Diluents Alone | | | | | | | | | | |
| (l) 50% 1,3,3-Trimethyl-1-phenyl indane 50% Kerosene | Resin | 38 | 60 | — | — | 17 | 28 | 32 | 39 | 41 |
| (m) 100% Dodecyl Benzene | Resin | >3 min. | — | — | — | 6 | 10 | 13 | — | 9 |
| (n) 100% Kerosene | Resin | >3 min. | — | — | — | 1 | 3 | 4 | 7 | 8 |
| (o) 100% Olive Oil | Clay | 30 | — | — | — | 27 | 30 | 32 | 36 | 38 |
| Controls - Prior Art Solvents | | | | | | | | | | |
| (p) Chlorinated Biphenyl (42% Cl) | Resin | 32 | 90 | — | — | 13 | 29 | 38 | 50 | 55 |
| (q) 50% Chlorinated Biphenyl 50% Kerosene | Resin | 11 | 20 | — | — | 28 | 43 | 46 | 49 | 54 |

The data in Table I illustrate that partially hydrogenated terphenyls having at least about 65 percent aromaticity as disclosed herein are particularly effective as solvents for chromogenic materials and are useful in preparing pressure-sensitive record materials. Specifically, these compounds promote a rapid rate of color development, a good depth or darkness of color, and good resistance to fading as evidenced by the depth of color remaining after 7 days exposure to incident light. The compounds of this invention are unexpectedly superior to hydrogenated terphenyl having only 60 percent aromaticity. Although little difference is seen in the performance of terphenyls having from 65 to 75 percent aromaticity, there is a surprising decrease in performance when aromaticity is reduced from 65 to 60 percent.

The partially hydrogenated terphenyls of this invention can in many instances be advantageously combined with a diluent or solvent as illustrated by the examples in Table II. Such combinations may be preferred to optimize physical properties of the solvent such as viscosity, melting point or volatility and to thereby facilitate the use of the solvent in the preparation of the pressure-sensitive record material. In some instances, the addition of a diluent may improve the speed or performance of the dye solution, as illustrated by a comparison of Examples (f) and (g). Typical diluents were evaluated as sole solvent compositions with the results obtained as shown by Examples (1) through (o) of Table II. It is evident from these data that these diluents have no practical utility as individual solvents and that the excellent results obtained with the terphenyl diluent combinations are due mainly to the presence of the terphenyl.

Chlorinated biphenyl having about 42 percent chlorine is a generally recognized commercial dye solvent which can be used alone or in combination with a diluent such as kerosene. Performance of these materials is illustrated by the data presented under Examples (p) and (q) in Table II. A comparison of these data with the results obtained for solvents comprising terphenyls according to the present invention shows that the compositions of this invention are in most instances equal to or better than polychlorinated biphenyl in general performance.

Although a preferred embodiment of this invention comprises a two-sheet system wherein the acidic receiving material is carried by one sheet and a marking fluid comprising a chromogen and solvent is carried by a second sheet, the marking fluid being released onto the acidic material by the application of pressure, the invention is not limited to such systems alone. The only essential requirement for a pressure-sensitive recording system is that the chromogen and the acidic sensitizing material be maintained in a separate or unreactive condition until pressure is applied to the system and that upon the application of pressure the chromogen and acidic material are brought into reactive contact. Thus it is possible to have the chromogen and acidic material present in a dry and unreactive state on a common carrier and to have the solvent alone carried on a separate sheet whereupon the application of pressure would release the solvent into the chromogen-acidic material mixture and promote localized reaction and color development. Obviously, many other arrangements, configurations and relationships of the solvent and the mark forming materials with respect to their encapsulation and location on the supporting sheet or webs can be envisioned, and such arrangements are within the scope of the present invention. For example, it is possible to coat a single paper or support member with all the components of this sstem to form a single self-contained unit which can be marked by the movement of a stylus or other pressure imparting means upon the surface of the paper. Such papers are particularly useful for use in inkless recording instruments.

Thus, the present invention encompasses pressure-sensitive recording paper systems utilizing a chromogenic material, an acidic sensitizing material, and a solvent comprising a terphenyl having an aromaticity of at least about 65 percent as the essential mark producing reactants. Many variations and combinations in the application of these reactants to prepare pressure-sensitive recording paper systems will be apparent to and within the knowledge of those skilled in the art and will depend upon such factors as the type of chromogenic material selected, the nature of the coating to be appled and its method of application, the number of supporting substrates employed, and the intended application of the system. Accordingly, the present invention is not to be limited by the specific details presented in the preceding descriptions and examples.

The embodiments of the invention in which an exclusive property or privilege is claimed are defined as follows:

1. A pressure-sensitive recording system comprising a. supporting paper sheet, b. mark forming components arranged in contiguous juxtaposition and supported by said paper sheet, said components comprising a chromogenic material and an electron accepting material of the Lewis acid type reactive with said chromogenic material to produce a mark when brought into reactive contact, and c. a pressure releasable liquid solvent for said chromogenic mark forming component, said solvent comprising partially hydrogenated terphenyls having from about 65 percent to about 85 percent aromaticity.

2. A system of claim 1 wherein the electron accepting material of the Lewis acid type is selected from the group consisting of acidic clay and acidic organic polymers.

3. A system of claim 1 wherein the chromogenic material is dissolved in the liquid solvent prior to bringing said chromogenic material and said electron accepting material into reactive contact.

4. A system of claim 1 wherein the mark forming components and the liquid solvent are present on a single support paper sheet.

5. A system of claim 1 wherein the chromogenic material comprises a phthalide compound.

6. A pressure-sensitive recording system comprising a. a first support paper sheet having disposed thereon a coating of a pressure releasable marking fluid, and b. a second supporting paper sheet having disposed thereon a coating of an electron accepting material of the Lewis acid type arranged in contiguous juxtaposition with the coating on said first supporting sheet, said marking fluid comprising a liquid solvent and a colorless or substantially colorless chromogenic material dissolved therein, said chromogenic material being reactive with said Lewis acid type material to produce a colored mark and said solvent comprising partially hydrogenated terphenyls having from about 65 percent to about 85 percent aromaticity.

7. A system of claim 6 wherein the electron accepting material of the Lewis acid type is selected from the group consisting of acidic clay and acidic organic polymers.

8. A system of claim 6 wherein the chromogenic material is dissolved in the liquid solvent prior to bringing said chromogenic material and said electron accepting material into reactive contact.

9. A system of claim 6 wherein the chromogenic material comprises a phthalide compound.

10. A method of marking on a paper substrate by developing a color from colorless or substantially colorless chromogenic compounds which comprises contacting said chromogenic compounds and an electron accepting material of the Lewis acid type in the presence of a liquid solvent comprising partially hydrogenated terphenyls having from about 65 percent to about 85 percent aromaticity.

11. A method of claim 10 wherein the electron accepting material of the Lewis acid type is selected from the group consisting of acidic clay and acidic organic polymers.

12. A method of claim 10 wherein the chromogenic material comprises a phthalide compound.

13. A method of claim 10 wherein the liquid solvent comprises

I. from about 30 to 70 percent by weight of terphenyl having from about 65 to 85 percent aromaticity, and II. up to about 70 percent by weight of an organic diluent.

14. A method of claim 13 wherein said organic diluent is a mineral or vegetable oil.

15. A method of claim 13 wherein said organic diluent is an aryl compound selected from the group consisting of aromatic naphtha, $C_{1-12}$ alkyl benzene, and $C_{1-6}$ alkyl aryl indane.

* * * * *